United States Patent
Petit et al.

(10) Patent No.: US 11,290,470 B2
(45) Date of Patent: Mar. 29, 2022

(54) MISBEHAVIOR PROTECTION FOR CONNECTED VEHICLE COMMUNICATION

(71) Applicant: Onboard Security, Inc., San Diego, CA (US)

(72) Inventors: Jonathan Petit, North Reading, MA (US); Mohammad Raashid Ansari, Andover, MA (US)

(73) Assignee: OnBoard Security, Inc., San Diego, CA (US)

( * ) Notice: Subject to any disclaimer, the term of this patent is extended or adjusted under 35 U.S.C. 154(b) by 443 days.

(21) Appl. No.: 16/501,283

(22) Filed: Mar. 15, 2019

(65) Prior Publication Data

US 2019/0312896 A1    Oct. 10, 2019

Related U.S. Application Data

(60) Provisional application No. 62/761,325, filed on Mar. 16, 2018.

(51) Int. Cl.
| | |
|---|---|
| *H04L 29/08* | (2006.01) |
| *H04L 29/06* | (2006.01) |
| *H04L 67/12* | (2022.01) |
| *G06F 40/40* | (2020.01) |

(52) U.S. Cl.
CPC ...... *H04L 63/1416* (2013.01); *H04L 63/1425* (2013.01); *H04L 67/12* (2013.01)

(58) Field of Classification Search
USPC ......................................................... 726/23
See application file for complete search history.

(56) References Cited

U.S. PATENT DOCUMENTS

| | | | | |
|---|---|---|---|---|
| 2009/0326791 | A1* | 12/2009 | Horvitz | G08G 1/00 701/119 |
| 2011/0072085 | A1* | 3/2011 | Standley | G06F 16/48 709/204 |
| 2013/0218379 | A1* | 8/2013 | Filev | G01F 9/023 701/22 |
| 2016/0041035 | A1* | 2/2016 | Allen | G01J 1/4228 356/402 |
| 2016/0140842 | A1* | 5/2016 | Park | G08G 1/052 340/905 |

(Continued)

*Primary Examiner* — Jude Jean Gilles
(74) *Attorney, Agent, or Firm* — Polsinelli LLP

(57) ABSTRACT

The invention is applicable for use in conjunction with a system that includes connected vehicle communications in which vehicles in the system each have an onboard processor subsystem and associated sensors, the processor subsystem controlling the generation, transmission, and receiving of messages communicated between vehicles for purposes including crash avoidance. A method is set forth for determining, by a given vehicle receiving messages, the occurrence of misbehavior, including the following steps: processing received messages by performing a plurality of plausibility determinations to obtain a respective number of plausibility measurements; determining at least one context for the region at which the given vehicle is located; weighting the plurality of plausibility measurements in accordance with values determined from the at least one context to obtain a respective plurality of plausibility indicator values; and deriving a misbehavior confidence indicator using the plausibility indicator values.

22 Claims, 6 Drawing Sheets

(56) References Cited

U.S. PATENT DOCUMENTS

2016/0335897 A1* 11/2016 Naserian ........... H04W 56/0035
2017/0332208 A1* 11/2017 Cardoso de Moura ......................
                                                      H04W 24/08
2017/0365171 A1* 12/2017 Haran .............. G08G 1/096791
2020/0139980 A1*  5/2020 Liu ....................... B60W 30/14

* cited by examiner

MISBEHAVIOR PROTECTION FOR CONNECTED VEHICLE COMMUNICATION

RELATED APPLICATION

This application claims priority from U.S. Provisional Patent Application No. 62/761,325 filed, Mar. 16, 2018, and said U.S. Provisional Patent Application is incorporated herein by reference.

FIELD OF THE INVENTION

This invention relates to the field of connected vehicle communication and, more particularly, to a method and system of misbehavior protection for connected vehicle communication.

BACKGROUND OF THE INVENTION

A part of the background hereof is disclosed in W. Whyte, A. Weimerskirch, V. Kumar, and T. Hehn, "A Security Credential Management System For V2V Communications", IEEE Vehicular Networking Conference, 2013. (The security credential management system described therein is sometimes referred to as "SCMS.") The SCMS for vehicle-to-vehicle ("V2V") communication was developed under a cooperative agreement with the US Department of Transportation. The system issues digital certificates to participating vehicles for establishing trust among them, which is necessary for safety applications primarily crash-avoidance. It supports four main use cases, namely, bootstrapping, certificate provisioning, misbehavior reporting and revocation. Regarding vehicle misbehavior in the context of SCMS, reference can be made to copending U.S. patent application Ser. No. 16/350,582, filed Dec. 3, 2018, of V. Kumar et al., and to U.S. patent application Ser. No. 16/350,955, filed Feb. 4, 2019, of J Petit et al., both Applications being assigned to the same assignee as the present Application.

FIG. 1 is a simplified diagram of portions of the Security Credential Management System (SCMS) as disclosed in Whyte et al., 2013, supra, incorporated herein by reference. (An updated version of the SCMS is disclosed in Benedikt Brecht, Dean Therriault, Andre Weimerskirch, William Whyte, Virendra Kumar, Thorsten Hehn, and Roy Goudy, "A Security Credential Management System for V2X Communications." In IEEE Transactions on Intelligent Transportation Systems, pp. 1022, 2018, which maintains, for the most part, the general nature of the SCMS described in the 2013 document.) In FIG. 1, the Pseudonym Certificate Authority (PCA) issues pseudonym certificates to devices (especially, vehicles). The Registration Authority (RA) validates, processes, and forwards requests for pseudonym certificates to the Pseudonym Certificate Authority. The Misbehavior Authority (MA) processes misbehavior reports to identify potential misbehavior by devices and, if necessary, revokes and adds devices to a Certificate Revocation List (not shown). It also initiates the process of linking a certificate identifier to the corresponding enrollment certificate, and adding the enrollment certificate to an internal blacklist. The Linkage Authority (LA) generates, from linkage seeds, linkage values which are used in the certificates and support efficient revocation. There are two LAs in the SCMS, referred to as LA1 and LA2. The Location Obscurer Proxy (LOP) hides the location of the requesting device by changing source addresses, and thus prevents linking of network addresses to locations. Additionally, when forwarding information to the Misbehavior Authority (MA), the LOP shuffles the reports to prevent the MA from determining the routes of vehicles reporting misbehavior. As disclosed in part of the above-reference copending '582 Application of V. Kumar et al., in conjunction with deriving the linkage values from linkage seeds, additionally encrypted linkage maps are produced that relate, in encrypted form, linkage values with linkage seeds from which they are derived, so that particular linkage values deemed to be of interest can be determined, based at least in part on information derived from misbehavior reports. Linkage seeds associated with particular linkage values of potentially misbehaving vehicles can subsequently be obtained utilizing decryptions of the encrypted linkage maps.

FIG. 2 is a block diagram of a prior art vehicle On Board Unit ("OBU"), shown in conjunction with some of the operational subsystems and components of a typical vehicle in a connected vehicle system. Reference can also be made to SAE specification J2945, which sets forth On Board System Requirements for V2V Safety Communications. The central processor unit and memory of the OBU are represented generally at 200. Interacting therewith are, typically, local sensors 210 (including cameras), V2X communication module 220, global navigation satellite system ("GNSS") 230, map data module 240, and message transmission and receiving subsystem 250. In the above-referenced copending '955 Application of J. Petit et al., a form of the disclosure is applicable for use in conjunction with a system for connected vehicle communications in which each vehicle in the system is issued a limited number of unique pseudonym certificates that are used by the vehicle to establish trust in messages sent by the vehicle by signing each message with a pseudonym certificate. A method is disclosed in the '955 Application, for selecting a pseudonym certificate for use, from among the vehicle's pseudonym certificates, so as to protect the privacy of the vehicle's activity against misbehavior such as attacks by eavesdroppers. The method includes steps of: tracking and storing vehicle location data; computing, from inputs that include the vehicle location data, the vehicle's relative achievable anonymity in particular geographical regions; prioritizing the pseudonym certificates; and selecting a pseudonym certificate for use from among the pseudonym certificates having a priority that is determined by the relative achievable anonymity for the geographical region in which the certificate is to be used.

The Onboard Unit (OBU) typically sends, receives, and processes messages coming from other vehicles or infrastructure (generally called Vehicle-to-X messages) to improve user's safety, driving experience and road efficiency. IEEE 1609.2 mandates the use of an authentication technique that provides node-centric trust (i.e. an OBU knows the received message is coming from an authorized and authenticated source). However, it is needed for an OBU to be able to assess the validity of the data being (authentically) transmitted, namely establish data-centric trust. This is a task of a local misbehavior detection system. The local misbehavior detection system runs on the vehicle system and analyzes incoming and outgoing V2X messages. When a misbehavior is detected, then one option for the misbehavior detection system is to generate a misbehavior report that contains the evidence of the misbehavior. This misbehavior report will then be transmitted to a backend server for further analysis. For example, the Security Credential Management System (SCMS), which is a security infrastructure that handles generation and revocation of security credentials, would receive such misbehavior reports to trigger a certificate revocation if deemed necessary. A revoked vehicle, i.e. its security credentials are revoked, will not be able to participate to the network and other entities receiving its messages will dismiss them. It is thus paramount to design an efficient local misbehavior detection system to ensure proper functioning of the overall system.

Other background techniques and systems, some of which utilize on board units (OBUs) and local processing, include the following: Schmidt, Robert K., Tim Leinmüller, Elmar Schoch, Albert Held, and Günter Schäfer, "Vehicle Behavior Analysis to Enhance Security in Vanets," In Proceedings of the 4th IEEE Vehicle-to-Vehicle Communications Workshop (V2VCOM2008), 2008; Park, Junkil, Radoslav Ivanov, James Weimer, Miroslav Pajic, and Insup Lee, "Sensor Attack Detection in The Presence of Transient Faults," In Proceedings of the ACM/IEEE Sixth International Conference on Cyber-Physical Systems, pp. 1-10, ACM, 2015; Kim, Tiffany Hyun-Jin, Ahren Studer, Rituik Dubey, Xin Zhang, Adrian Perrig, Fan Bai, Bhargav Bellur, and Aravind Iyer, "Vanet Alert Endorsement Using Multi-Source Filters," In Proceedings of the seventh ACM international workshop on VehiculAr InterNETworking, pp. 51-60, ACM, 2010; Cao, Zhen, Jiejun Kong, Uichin Lee, Mario Gerla, and Zhong Chen, "Proof-of-Relevance: Filtering False Data Via Authentic Consensus in Vehicle ad-hoc Networks," In IEEE INFOCOM Workshops 2008, pp. 1-6, IEEE, 2008; Firl, Jonas, et al., "MARV-X: Applying Maneuver Assessment for Reliable Verification of Car-to-X Mobility Data," IEEE Transactions on Intelligent Transportation Systems 14.3 (2013): 1301-1312; Sun, Mingshun, Ming Li, and Ryan Gerdes, "A Data Trust Framework for Vanets Enabling False Data Detection And Secure Vehicle Tracking,"2017 IEEE Conference on Communications and Network Security (CNS), IEEE, 2017; Han, Guangjie, et al., "Two Novel DOA Estimation Approaches for Real-Time Assistant Calibration Systems in Future Vehicle Industrial," IEEE Systems Journal 11.3 (2017): 1361-1372; Yao, Yuan, et al., "Multi-Channel Based Sybil Attack Detection in Vehicular Ad Hoc Networks Using RSSI," IEEE Transactions on Mobile Computing 18.2 (2019): 362-375; Yao, Yuan, et al., "Voiceprint: A Novel Sybil Attack Detection Method Based on RSSI for VANETs," 2017 47th Annual IEEE/IFIP International Conference on Dependable Systems and Networks (DSN), IEEE, 2017; Sun, Mingshun, Ming Li, and Ryan Gerdes, "Truth-Aware Optimal Decision-Making Framework with Driver Preferences for V2V Communications," 2018 IEEE Conference on Communications and Network Security (CNS), IEEE, 2018; Van der Heijden, Rens W., Frank Kargl, and Osama MF Abu-Sharkh, "Enhanced Position Verification for Vanets Using Subjective Logic," 2016 IEEE 84th Vehicular Technology Conference (VTC-Fall), IEEE, 2016; and Yavvari, Chaitanya, Zoran Duric, and Duminda Wijesekera, "Vehicular Dynamics Based Plausibility Checking," 2017 IEEE 20th International Conference on Intelligent Transportation Systems (ITSC), IEEE, 2017. Also, see U.S. Pat. Nos. 8,214,147 and 9,990,844, and U.S. Patent Application Publications US2013/0217353, US2016/0140842, and US2017/0365171. For the most part, the approaches of these documents are quite specific to a particular type of plausibility, determination of a particular type of misbehavior, or determination that a specific type of attack may be in progress. It is among the objectives of the present invention to provide a more comprehensive and complete solution to misbehavior recognition and protection.

SUMMARY OF THE INVENTION

The present invention provides a relatively comprehensive and complete solution to misbehavior recognition and protection in connected vehicle systems. The features described in the following summary provide substantial advantages over prior misbehavior protection approaches, such as those listed in the Background section hereof.

The present invention is applicable for use in conjunction with a system that includes connected vehicle communications in which vehicles in the system each have an onboard processor subsystem and associated sensors, the processor subsystem controlling the generation, transmission, and receiving of messages communicated between vehicles for purposes including crash avoidance. In an embodiment of the invention, a method is set forth for determining, by a given vehicle receiving messages, the occurrence of misbehavior, including the following steps: processing received messages by performing a plurality of plausibility determinations to obtain a respective number of plausibility measurements; determining at least one context for the region at which said given vehicle is located; weighting said plurality of plausibility measurements in accordance with values determined from said at least one context to obtain a respective plurality of plausibility indicator values; and deriving a misbehavior confidence indicator using said plausibility indicator values.

In a form of this embodiment, the steps of said method are implemented under control of at least one electronic processor subsystem, which can comprise said onboard unit operating in conjunction with at least one special purpose processor. In this form of the invention, the misbehavior confidence indicator can comprise an array of said plausibility indicator values and/or a value derived from a count of plausibility indicator values that meet predetermined criteria, and/or a sum of at least a plurality of plausibility indicator values that meet predetermined criteria. Also in this form of the invention, said step of performing a plurality of plausibility determinations comprises performing several plausibility determinations, and the plausibility determinations are performed either in parallel or in a series sequence.

A further form of this embodiment of the invention further comprises providing a number of misbehavior detection routines, and implementing said misbehavior detection routines in conjunction with said plausibility confidence indicator to obtain an indication of misbehavior that is occurring. The step of providing a number of misbehavior detection routines can comprise providing misbehavior detection routines which can recognize characteristics of behavior of message sources as being an indication of a particular type of cyber attack.

In another embodiment of the invention, a method for determining, by a given vehicle receiving messages, the occurrence of misbehavior, includes the following steps: processing received messages by performing a plurality of plausibility determinations to obtain a respective number of plausibility measurements from which a respective plurality of plausibility indicator values are derived; providing a plurality of misbehavior detection routines; implementing said misbehavior detection routines in conjunction with said plurality of plausibility indicator values; and determining the occurrence of misbehavior from the outputs of said misbehavior detection routines. A form of this embodiment further comprises determining at least one context for the region at which said given vehicle is located, and said misbehavior detection routines are implemented in conjunction with values determined from said at least one context. In this embodiment, the misbehavior detection routines can be performed in parallel or in a series sequence.

In another embodiment of the invention, a method is set forth for determining, by a given vehicle receiving messages, the occurrence of misbehavior, comprising the following steps: processing received messages by performing a plurality of plausibility determinations to obtain a respective number of plausibility measurements; determining at least one context for the region at which said given vehicle is located; deriving, from said at least one context, rankings of the plausibility determinations and their associated measurements, and weighting said measurements in accordance with the rankings to obtain an array of plausibility indicator values; providing a plurality of misbehavior detection routines; selecting at least some of the misbehavior detection routines in accordance with said at least one context; implementing the selected misbehavior routine in conjunction with respective members of the array of plausibility indicators; and determining occurrence of misbehavior from the outputs of the selected misbehavior detection routines.

In still another embodiment of the invention, a method is set forth for determining, by a given vehicle receiving messages, the occurrence of misbehavior, comprising the steps of: processing received messages by performing a plurality of plausibility determinations to obtain a respective number of plausibility measurements; determining at least one context for the region at which said given vehicle is located; deriving, from said at least one context, rankings of the plausibility determinations and their associated measurements; implementing plausibility determinations and weightings in accordance with values determined from said at least one context, in a sequence that depends on said rankings, and accumulating the resultant plausibility indications until said accumulation exceeds a predetermined threshold; providing a plurality of misbehavior detection routines; sequentially implementing each of said misbehavior detection routines in conjunction with said at least one context and said accumulation of plausibility indications to obtain a misbehavior output; and issuing a misbehavior warning depending on said misbehavior output.

Further feature and advantages of the invention advantages of the invention will become more readily apparent from the following detailed description when taken in conjunction with the accompanying drawings.

DETAILED DESCRIPTION

Figure 1:
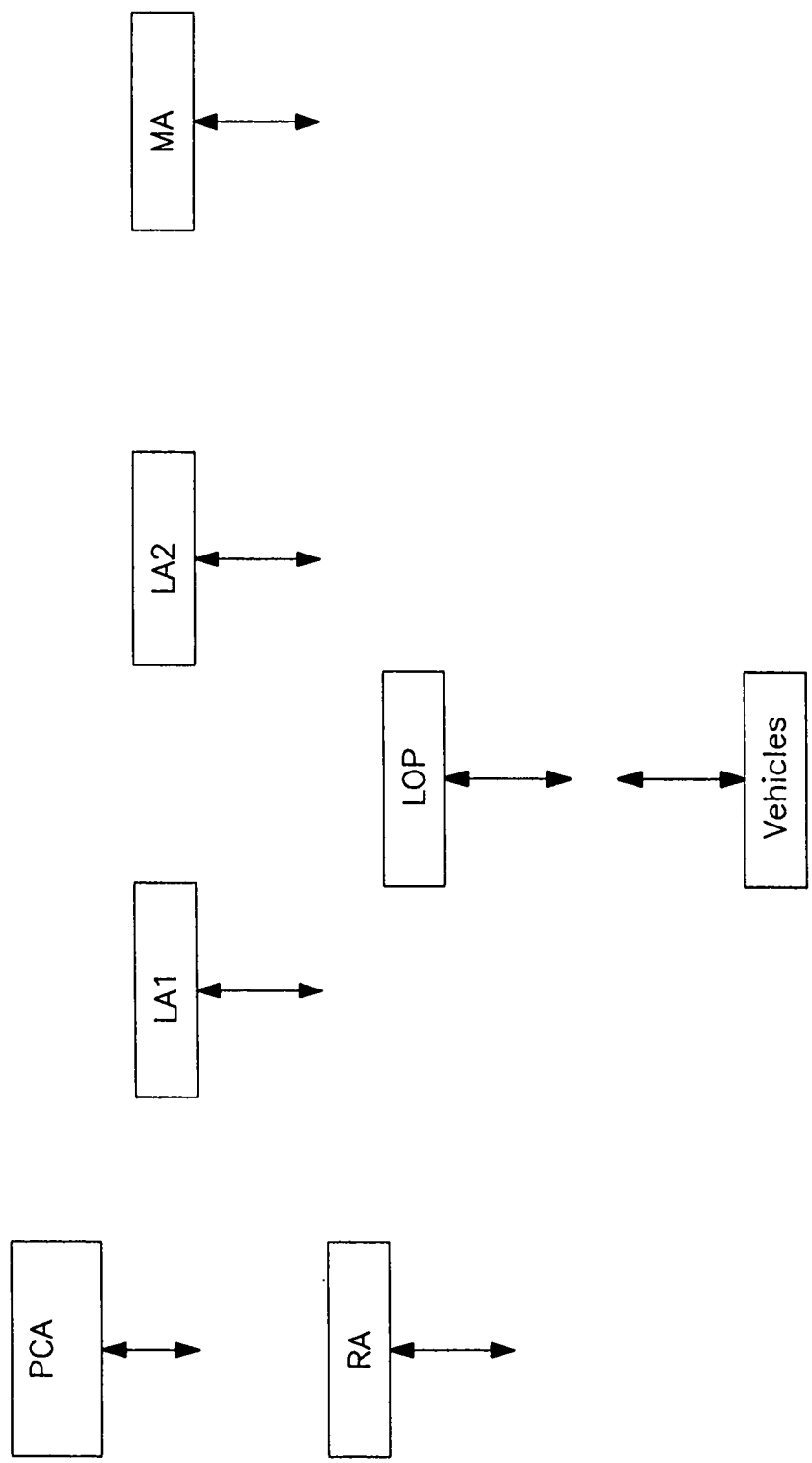
FIG. 1 is a simplified block diagram of part of a prior art security credential management system for vehicle-to-vehicle communication.
Figure 2:
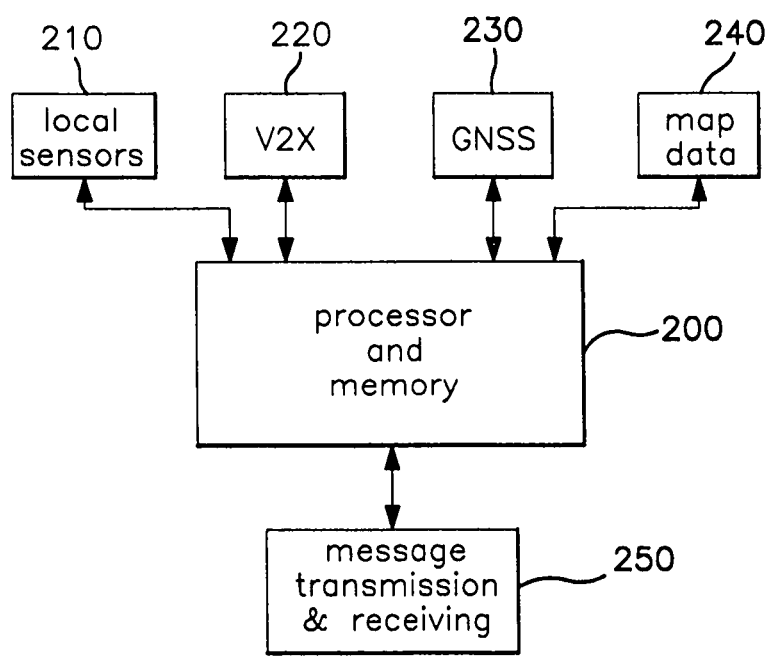
FIG. 2 is a block diagram of a vehicle's On Board Unit (OBU).
Figure 3:
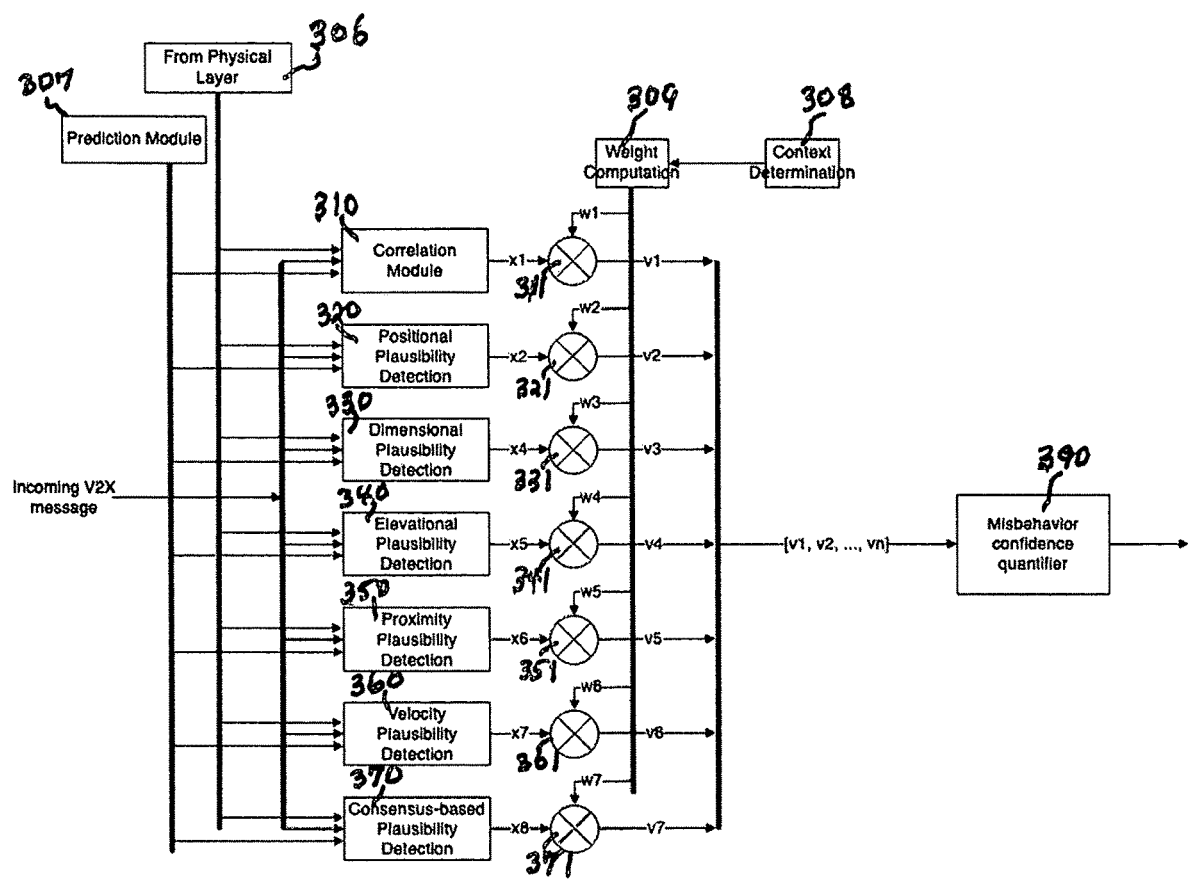
FIG. 3 is a flow diagram, partially in block form, of a routine for controlling a processor, such as the processor of the onboard unit (OBU), to implement an embodiment of the invention.

FIG. 3 is a flow diagram, partially in schematic block form, illustrating an embodiment of the invention for producing plausibility indicator values and a misbehavior confidence indicator. Received V2X messages, including especially V2V messages (typically basic safety messages (BSMs)), are shown as being input to detection modules 310, 320, 330, 340, 350, 360, and 370. The modules 310-370 each also receive signals representative of information, from the physical layer (as represented by the block 306), and from a prediction module (represented at 307). The information from the physical layer includes, for example, the direction of arrival and signal strength of received messages. The information from prediction module includes information regarding prior messages and the outputs of, for example, a Kalman filter and/or other known prediction algorithms or routines that determine, from prior messages and other information received from sensors and other available sources, prediction information that is used in computations that determine plausibility in accordance with routines employed by the detectors 310-370.

The correlation module plausibility detection (block 310) operates to find consistency between various parameters in a BSM/V2X message. For example:

If brakes have been applied, acceleration should be below zero (negative).

If acceleration is not zero, speed should not be zero.

The positional plausibility detection (block 320) operates to detect if the location claimed in a BSM is plausible. This detector can check whether:

The location is on a road.

If position is the same as seen in a previous BSM, speed should be zero.

The location overlaps a location sent in a BSM sent by another vehicle.

The location in current BSM is consistent with location in a previous BSM, based on speed and acceleration in previous BSM.

The dimensional plausibility detection module (block 330) detects if the dimensions claimed in a BSM are plausible. This detector can check whether:

Length and width of a vehicle has changed over time.

Length and width correspond to acceleration and speed information of that type of vehicle.

Abnormal length and width information is being transmitted, e.g. a 4-lane wide vehicle.

The elevational plausibility detection module (block 340) operates to detect if the elevation claimed in a BSM is plausible. This detector can check whether:

A claimed elevation corroborates to a particular location, e.g. elevation claims vehicle is on a bridge whereas no bridge exists in that location.

A high modulation occurs in elevation values between consecutive BSMs.

The proximity plausibility detection module (block 350) operates to detect proximity between vehicles, and is similar to positional plausibility.

The velocity plausibility detection (block 360) operates to detect if the velocity/speed information correlates to information in same BSM or previous BSMs. For example:

If position in consecutive BSMs does not change, is the speed zero.

The consensus-based plausibility detection (block 370) relies on information from neighboring vehicles. Consensus can be reached on traffic events, such as, an accident or an event where a vehicle performed extremely dangerous braking. These techniques are used to gather evidence of such an event in case the misbehavior protection system on a local vehicle detects a misbehavior.

The functions of detectors 310-370 can be performed using hardware and/or software implementations. Special-purpose processor modifications of an OBU (see e.g. FIG. 6), such as can be achieved with specialized chips, would provide the substantial advantage of high speed on-board implementation.

A context determination module 308 receives inputs that will be described hereinbelow, and produces signals representative of settings, conditions, and circumstances in the region surrounding the vehicle. The output of the context detection block is received by weighting computation module 309, which computes the relative significance, for particular current context(s), of each plausibility measurement, and outputs respective weights for that reflect such significance. In FIG. 3, the plausibility measurements output from plausibility detectors 310, 320, 330, 340, 350, 360, and 370 (respectively designated x1, x2, x3, x4, x5, x6, and x7), are respectively coupled, as an input, to multipliers 311, 321, 331, 341, 351, 361, and 371, each of which receives, as its other input, the particular weighting to be applied to the plausibility measurement. The weighted plausibility measurements (designated v1, v2, v3, v4, v5, v6, and v7), called plausibility indicator values, are output, as a one-dimensional array, to misbehavior confidence quantifier 390 which, in this embodiment, can provide a weighted sum of the input values and/or a count of plausibility indicator values that meet a predetermined criterion, such as exceeding a particular threshold, or a combination of such values to be taken as a misbehavior confidence indicator. In embodiments hereof, the array of weighted outputs and/or the misbehavior confidence indicators can be provided, as some of the inputs to misbehavior detection routines.

Figure 4:
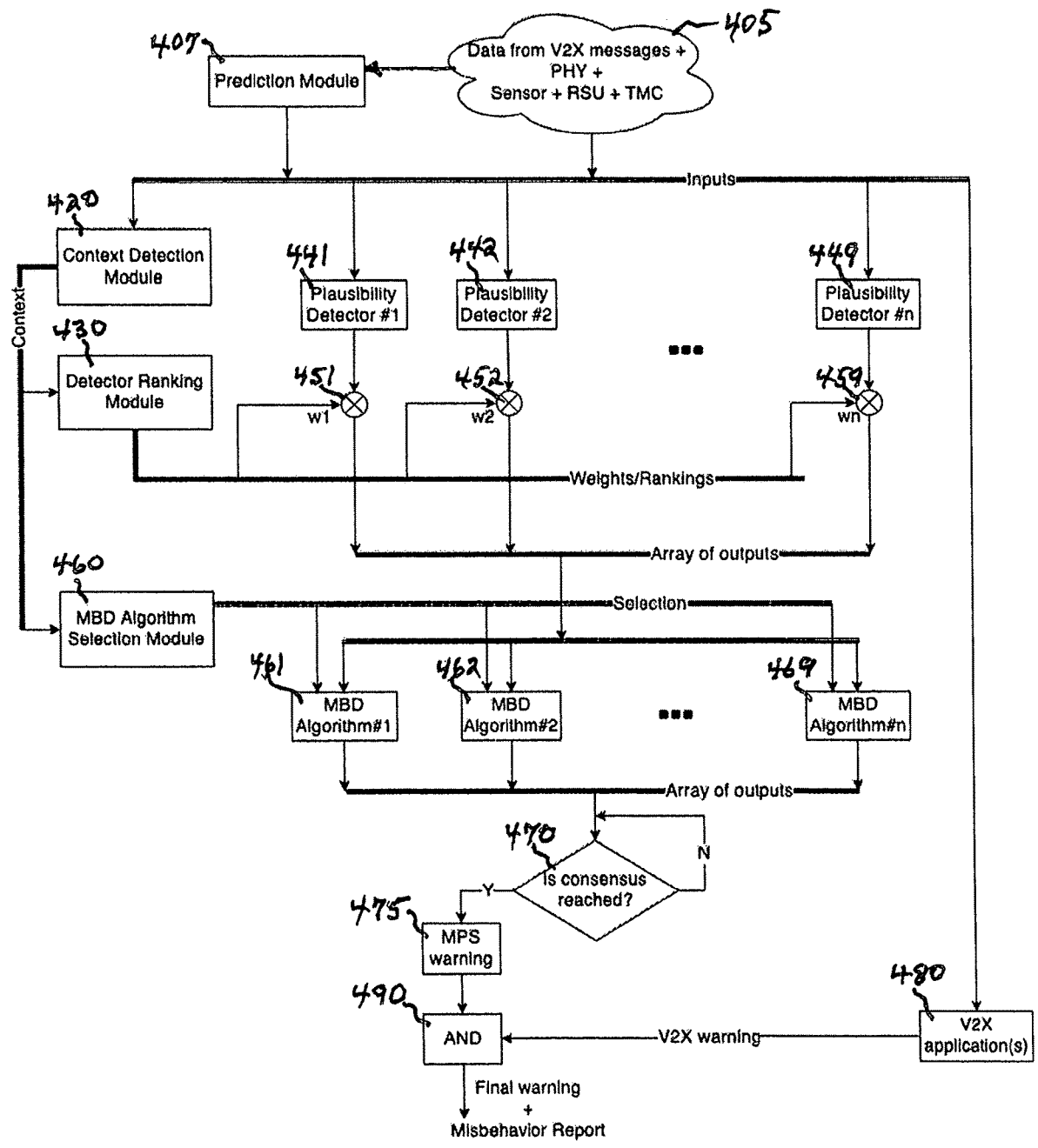
FIG. 4 is a flow diagram, partially in block form, of a routine for controlling a processor, such as the processor of the onboard unit (OBU), to implement another embodiment of the invention.

FIG. 4 is a diagram of a routine under control of a processor, for example the processor of the onboard unit, for implementing an embodiment of the invention. Available signals, representative of input information, are represented in the region 405. The exemplary inputs shown in region 405 include V2X messages (including messages such as basic safety messages (BSMs) from other vehicles, messages from control authorities, messages from roadside units, etc.), physical layer data (PHY), and sensor data (such as data from cameras and other sensors, global positioning data, etc.). As in the FIG. 3 embodiment, inputs from a prediction module 407 can also be utilized. The inputs are provided to context determination module 420 and to plausibility detector #1 (block 441) plausibility detector #2 (block 442) . . . plausibility detector #n (block 449). The context determination module 420 operates, as previously described, to determine the context in which the vehicle is operating, and the determined context is provided as an input to the blocks 430 and 460. The detector ranking module block 430 functions to rank the plausibility detectors based on their significance in situations that arise when a particular context or contexts are deemed to be present. As an example, when a context determination of high density of traffic is made, the plausibility detector for proximity plausibility detector will be assigned a relatively high ranking, and the plausibility detector for dimensional plausibility detection will be assigned a relatively low ranking. The block 430 provides weightings to the plausibility detector outputs. This is implemented using multipliers 451, 452, . . . 459, which respective apply the weightings w1, w2, . . . wn.

The output of the context determination module 420 is also coupled to misbehavior algorithm selection module 460 which selects from among the available algorithms (routines) that implement misbehavior detection. These can include, for example, known algorithms based on single threshold analysis, combined threshold analysis, exponentially weighted moving average analysis, artificial intelligence (AI) based technique, machine learning based technique, or deep learning based technique. The selected misbehavior detection algorithms, designated MBD algorithm #1 (block 461), MBD algorithm #2 (block 462), . . . MBD algorithm #n (block 469), can be implemented in parallel, which is facilitated and expedited by special purpose processors, e.g. a specialized chip for each algorithm (routine).

Figure 6:
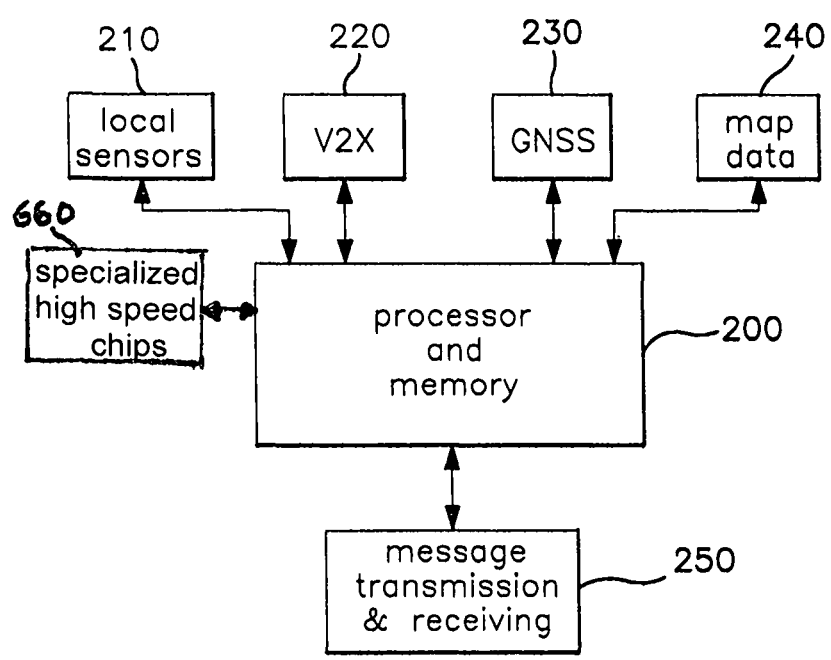
FIG. 6 is a block diagram illustrating of an OBU that can be used in practicing embodiments of the invention.

FIG. 6 illustrates an onboard unit (OBU) which has been equipped with special purpose high speed chips (660), especially for implementing the misbehavior detection algorithm routines hereof.

Returning to FIG. 4, the array of outputs from the misbehavior algorithms are coupled to decision block 470, which determines whether a consensus of the selected algorithm outputs been reached. If not, the block 470 is re-entered for determination at the next cycle. If affirmative, however, a misbehavior warning is issued (block 475), and a positive indication is, in this embodiment, optionally input to AND gate 490, which receives, as its other input, a signal which is positive when a standard V2X application safety warning is issued. If the inputs to gate 490 are both positive, a final warning can be issued, and a misbehavior report can be communicated to central authority.

Figure 5:
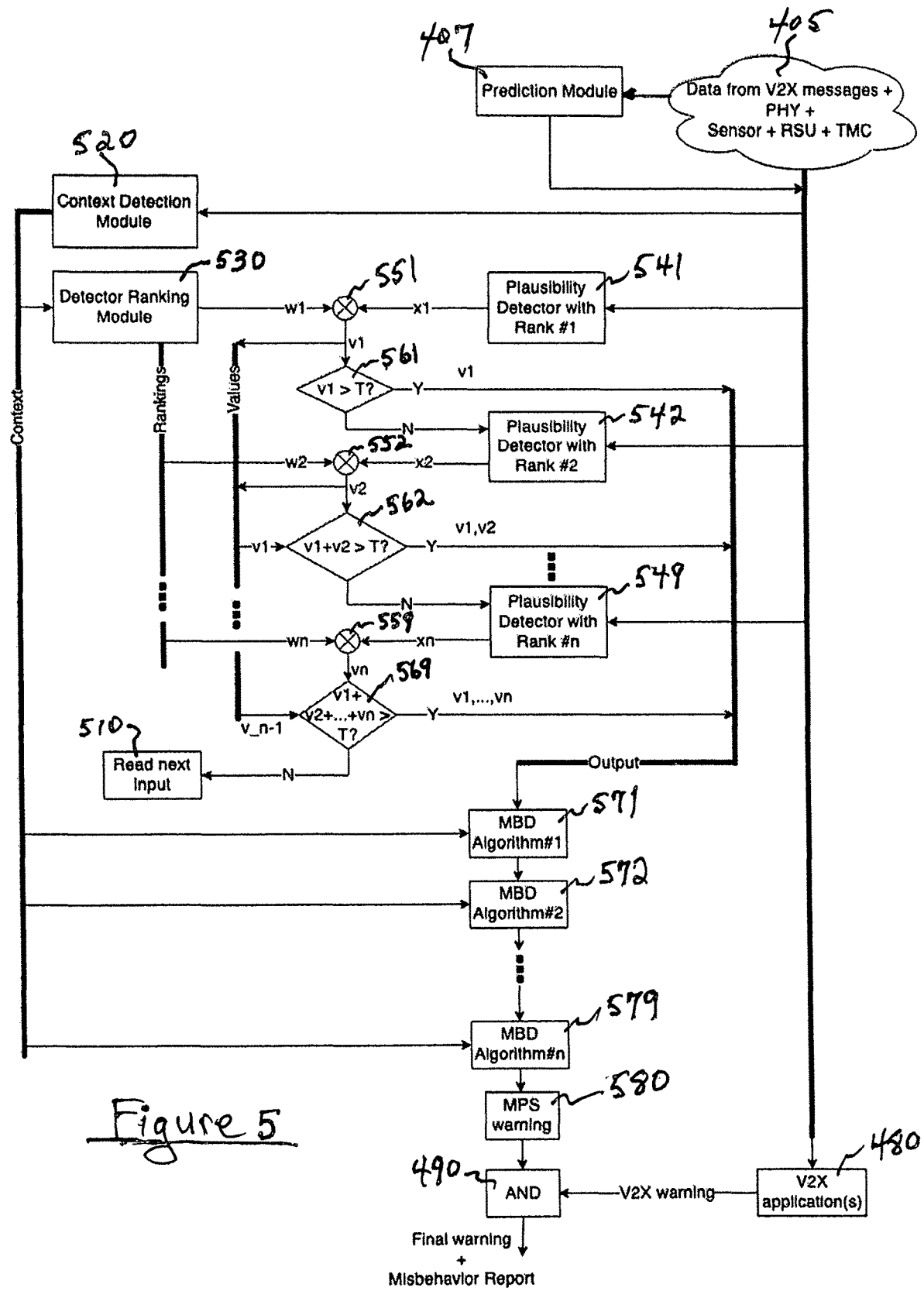
FIG. 5 is a flow diagram, partially in block form, of a routine for controlling a processor, such as the processor of the onboard unit (OBU), to implement a further embodiment of the invention.

The embodiment of FIG. 5, utilizes, inter alia, serial processing of plausibility detection and of subsequent implementation of misbehavior detection algorithms. In FIG. 5, the input information signals from sources indicated in region 405 and block 407 can be the same as described for like reference numerals in FIG. 4. The context detection module 520 and detector ranking module 530 are functionally similar to the blocks 420 and 430, respectively. In this embodiment, the plausibility detectors with ranks #1 (block 541), #2 (block 542), . . . #n (block 549) receive the indicated inputs and produce, in the ranked sequence (and if reached in the process, as will become clear), output values respectively designated x1, x2, xn, . . . which are coupled to respective multipliers 551, 552, . . . 559, which also receive respective weighting signals w1, w2, . . . wn from ranking module 530, and produce respective output plausibility indicator values v1, v2, . . . vn. In operation, the value v1 is input to decision block 561, and a determination is made as to whether v1 is greater than a predetermined threshold T. If so, v1 is output to the first misbehavior detection algorithm (block 571), and the serial MBD processing can begin. If not, the next plausibility detection module is called upon, and its weighted output value v2, as well as the previous weighted value v1 (received via the bold vertical "values" line), are input to decision block 562, which determines whether the sum v1 plus v2 is greater than the threshold T. If not, the process continues, as the next output value is accumulated at the next decision block, whereas, if so, v1, v2 are output as inputs to the first misbehavior detection algorithm (block 571). Eventually, if the decision blocks keep indicating that the accumulated sum does not exceed the threshold, the decision block 569 is reached, and the sum v1+v2+ . . . vn is tested against the threshold. If T is exceeded, v1, v2, . . . vn are output to block 571 but, if not exceeded, the process, for the current input, does not provide a finding of the plausibility of misbehavior, and the next input is read in (block 510) for processing. Once the block 571 is entered, the accumulated plausibility values are used, as well as the current context, in serially applying the routines of MBD algorithms #1 (block 571), #2 (block 572) . . . #n (block 579), and an MPS warning (block 580), if warranted, is issued. Then, as in FIG. 4, the indications of an MPS warning and a V2X warning (from block 480) can be ANDed (block 490) to determine whether a final warning and misbehavior report are warranted.

The invention claimed is:

1. For use in conjunction with a system that includes connected vehicle communications in which vehicles in the system each have an onboard processor subsystem and associated sensors, said processor subsystem controlling the generation, transmission, and receiving of messages communicated between vehicles for purposes including crash avoidance; a method for determining, by a given vehicle receiving messages, the occurrence of misbehavior comprising the steps of:

processing received messages by performing a plurality of plausibility determinations to obtain a respective number of plausibility measurements;

determining at least one context for the region at which said given vehicle is located;

weighting said plurality of plausibility measurements in accordance with values determined from said at least one context to obtain a respective plurality of plausibility indicator values; and deriving a misbehavior confidence indicator using said plausibility indicator values.

2. The method as defined by claim 1, wherein the steps of said method are implemented under control of at least one electronic processor subsystem.

3. The method as defined by claim 2, wherein said at least one electronic processor subsystem comprises said onboard processor subsystem operating in conjunction with at least one special purpose processor.

4. The method as defined by claim 1, wherein said misbehavior confidence indicator comprises an array of said plausibility indicator values.

5. The method as defined by claim 1, wherein said misbehavior confidence indicator comprises a value derived from a count of plausibility indicator values that meet predetermined criteria.

6. The method as defined by claim 1, wherein said misbehavior confidence indicator comprises a sum of at least a plurality of plausibility indicator values that meet predetermined criteria.

7. The method as defined by claim 1, wherein said step of determining at least one context comprises determining a plurality of contexts.

8. The method as defined by claim 1, wherein said step of performing a plurality of plausibility determinations comprises performing several plausibility determinations.

9. The method as defined by claim 1, wherein said plurality of plausibility determinations are performed in parallel.

10. The method as defined by claim 1, wherein said step of performing a plurality of plausibility determinations comprises performing several plausibility determinations in a series sequence.

11. The method as defined by claim 1, further comprising providing a number of misbehavior detection routines, and implementing said misbehavior detection routines in conjunction with said plausibility confidence indicator to obtain an indication of misbehavior that is occurring.

12. The method as defined by claim 11, wherein said indication of occurrence of misbehavior comprises an indication of a particular type of cyber attack that may be occurring.

13. The method as defined by claim 11, wherein said step of providing a number of misbehavior detection routines comprises providing misbehavior detection routines which can recognize characteristics of behavior of message sources as being an indication of a particular type of cyber attack.

14. The method as defined by claim 1, wherein said step of determining at least one context comprises determining at least one context from a group consisting of vehicle population, neighboring vehicle telemetry, time of day, weather, risk/threat model, computation overhead, communication overhead, location, and environment.

15. For use in conjunction with a system that includes connected vehicle communications in which vehicles in the system each have an onboard processor subsystem and associated sensors, said processor subsystem controlling the generation, transmission, and receiving of messages communicated between vehicles for purposes including crash avoidance; a method for determining, by a given vehicle receiving messages, the occurrence of misbehavior comprising the steps of:

processing received messages by performing a plurality of plausibility determinations to obtain a respective number of plausibility measurements from which a respective plurality of plausibility indicator values are derived;

providing a plurality of misbehavior detection routines;

implementing said misbehavior detection routines in conjunction with said plurality of plausibility indicator values; and determining the occurrence of misbehavior from the outputs of said misbehavior detection routines.

16. The method as defined by claim 15, wherein the steps of said method are implemented under control of at least one electronic processor subsystem.

17. The method as defined by claim 16, wherein said at least one electronic processor subsystem comprises said onboard processor subsystem operating in conjunction with at least one special purpose processor.

18. The method as defined by claim 15, further comprising determining at least one context for the region at which said given vehicle is located, and wherein said misbehavior detection routines are implemented in conjunction with values determined from said at least one context.

19. The method as defined by claim 15, wherein said misbehavior detection routines are performed in parallel.

20. The method as defined by claim 15, wherein said misbehavior detection routines are performed in a series sequence.

21. For use in conjunction with a system that includes connected vehicle communications in which vehicles in the system each have an onboard processor subsystem and associated sensors, said processor subsystem controlling the generation, transmission, and receiving of messages communicated between vehicles for purposes including crash avoidance; a method for determining, by a given vehicle receiving messages, the occurrence of misbehavior, comprising the steps of:

processing received messages by performing a plurality of plausibility determinations to obtain a respective number of plausibility measurements;

determining at least one context for the region at which said given vehicle is located;

deriving, from said at least one context, rankings of the plausibility determinations and their associated measurements, and weighting said measurements in accordance with the rankings to obtain an array of plausibility indicator values;

providing a plurality of misbehavior detection routines;

selecting at least some of the misbehavior detection routines in accordance with said at least one context;

implementing the selected misbehavior routine in conjunction with respective members of the array of plausibility indicators; and determining occurrence of misbehavior from the outputs of the selected misbehavior detection routines.

22. For use in conjunction with a system that includes connected vehicle communications in which vehicles in the system each have an onboard processor subsystem and associated sensors, said processor subsystem controlling the generation, transmission, and receiving of messages communicated between vehicles for purposes including crash avoidance; a method for determining, by a given vehicle receiving messages, the occurrence of misbehavior, comprising the steps of:

processing received messages by performing a plurality of plausibility determinations to obtain a respective number of plausibility measurements;

determining at least one context for the region at which said given vehicle is located;

deriving, from said at least one context, rankings of the plausibility determinations and their associated measurements;

implementing plausibility determinations and weightings in accordance with values determined from said at least one context, in a sequence that depends on said rankings, and accumulating the resultant plausibility indications until said accumulation exceeds a predetermined threshold;

providing a plurality of misbehavior detection routines;

sequentially implementing each of said misbehavior detection routines in conjunction with said at least one context and said accumulation of plausibility indications to obtain a misbehavior output; and issuing a misbehavior warning depending on said misbehavior output.

* * * * *